Aug. 5, 1947.　　　　K. K. NEWSOM　　　　2,425,117
FOOD PROCESS
Original Filed April 13, 1942　　2 Sheets-Sheet 1

INVENTOR.
KITCHENER K. NEWSOM
BY
Boykin, Mohler & Buckley
ATTORNEYS.

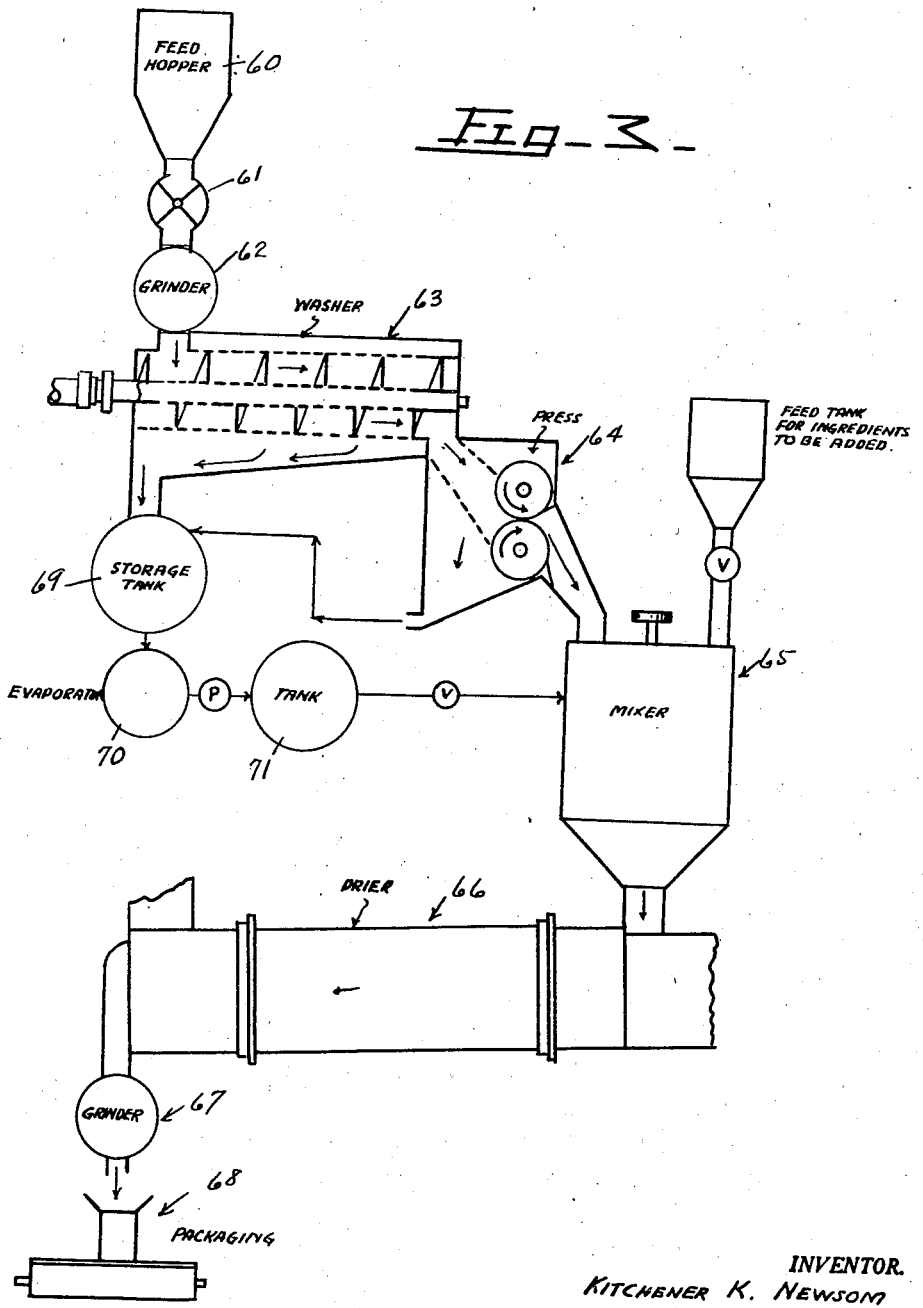

Patented Aug. 5, 1947 2,425,117

UNITED STATES PATENT OFFICE 2,425,117

FOOD PROCESS

Kitchener K. Newsom, San Francisco, Calif.

Original application April 13, 1942, Serial No. 438,687. Divided and this application November 13, 1943, Serial No. 510,122

3 Claims. (Cl. 99—204)

This is a division of my co-pending application, Serial No. 438,687, filed April 13, 1942, and relates to an improved food process and product.

One of the objects of this invention is a simple, rapid and economical process for making a dried, granular or powdered fruit or vegetable product that will not become gummy, and that will not form a caked mass when exposed to an atmosphere of relatively high humidity for a relatively long period of time.

Another object of the invention is a process for making a dried fruit or vegetable product that will not become gummy or caked when exposed to the atmosphere and which process does not impair or reduce the carotene content in those fruits or vegetables that contain the same, such as apricots, mangoes, guavas, etc.

A still further object is an improved, granular or powder-like product that will not become gummy or cake when exposed to atmosphere of relatively high humidity.

The invention can be best understood by comparing the product of the method herein described with the products of ordinary conventional processes. It is a well known fact that fruit and vegetable powders or granules as heretofore produced cannot be used without the employment of a filler of some kind to prevent caking of the powder or mass of granules. Onion salt, garlic salt, celery salt, etc., are up to 80% sodium chloride, and the actual onion or garlic or celery powder therein is a fraction of the mass. Apricot, prune, mango, guava and other flours have been produced, but after exposure to atmosphere of only normal relative humidity they become gummy and cake, and the cake so formed cannot be restored to the original powder-like consistency without detrimental re-drying and re-grinding.

Taking dried apricots as an example, after further drying and powdering thereof by the usual methods until the moisture content is, say only about 4% by weight, it is found that after about seventeen hours exposure in an open room, with temperature from 60 to 70° F. and relative humidity between 60 and 80%, the product became a gummy, caked mass unsuitable for practical handling and use. Also the powder had a protein content of only about 4.8% by weight and only about 8.6 milligrams of carotene (pro-vitamin A) per each 100 grams.

On the other hand, apricot powder produced by my process, as hereinafter described, has been subjected to the same conditions as described above for about two weeks without becoming gummy or caked. A very slight tendency for the surface granules or particles to adhere appeared but a slight agitation of the mass, as by stirring, immediately broke the adherence and the powder flowed as readily as before being subjected to this moist air, although its moisture content had increased from about 4% to about 19%.

Furthermore the protein content of the product of my process was over 6% by weight, and there were practically 26 milligrams of carotene (pro-vitamin A) for each 100 grams of powder. This is the equivalent of over 43,000 International units of vitamin A per each hundred grams. At this rate less than a single ounce of apricot powder or granules produced by my process would furnish a very ample daily supply of vitamin A to a person.

In the drawings,

Fig. 3 is a diagrammatic view of a still different form of apparatus that may be used.

In the description, it is not intended that the use of conventional water or steam blanchers cannot be used in the same manner as heretofore in advance of the washing step that is herein described as part of my process.

Figure 1:
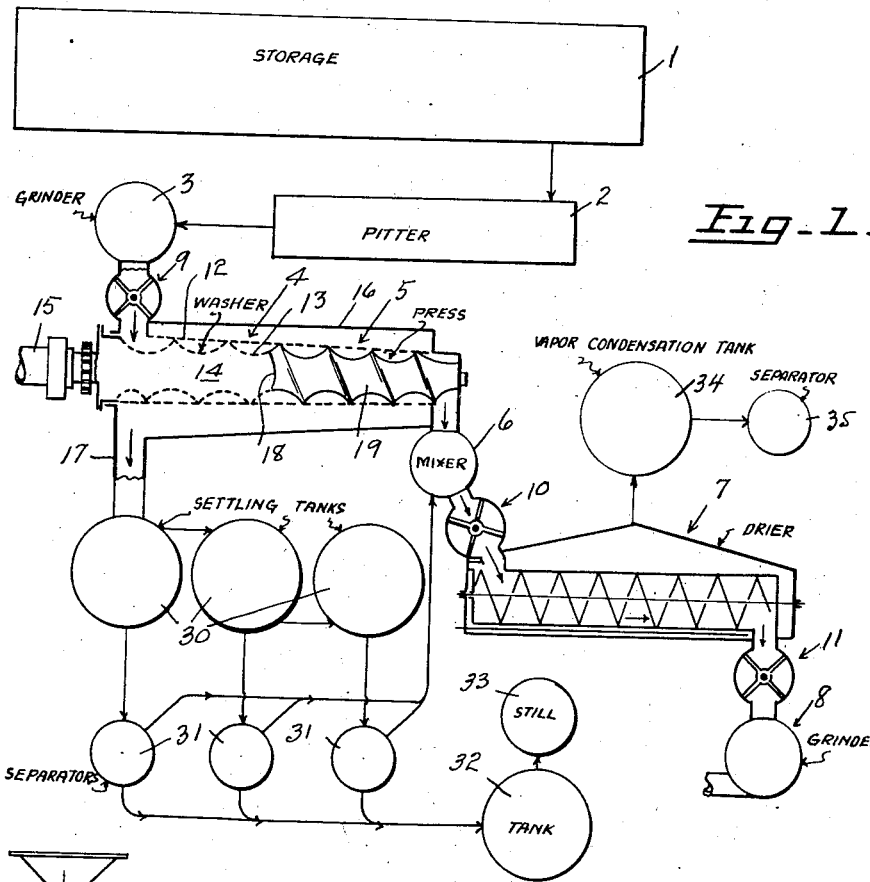
Fig. 1 is a diagrammatic view of one form of apparatus that may be used to carry out the steps of my process.

In detail, referring to Fig. 1, the whole fruit or vegetables may be fed from a source of supply 1 to pitters, peelers or corers 2 and from this to a grinder, shredder or cutter 3. After passing through the grinder 3, the particles or pieces of cut fruit are fed to the washer 4 and from the washer 4 to a press 5 and from press 5 to a mixer 6. After passing through the mixer 6, the material may be passed through a drier 7 and then through another grinder 8. Rotary feed valves and automatic closures 9, 10, 11 may respectively be positioned between grinder 3 and washer 4, and between press 6 and drier 7, and between drier 7 and grinder 8, if desired, thus providing means for conducting the washing and pressing, or the final drying, or all three, including the mixing step out of direct influence of the atmosphere, although the drier 7 may be of the conventional hot air or tunnel drier type.

The fruit that is fed into the washer 4 is preferably cut, as by grinding, dicing, slicing or halving so as to expose the flesh thereof so that the wash water will be effective for removing certain objectionable ingredients within a sufficiently short period of time to enable retention of desired parts that might otherwise be washed therefrom.

The washer and press, as shown, are combined, and the particular device illustrated is shown and described more in detail in my co-pending application, Serial No. 438,687, of which this application is a division. However, the washer and press may be separate conventional pieces of equipment, if desired, as indicated in Fig. 3, and in certain cases the press may be omitted.

In the process as shown in Fig. 1, the washer, generally indicated at 4, may be a stationary tubular perforated member 12 having a screw conveyor 13 coaxially fitted therein. The latter has a central passageway 14 with perforated walls and may be rotated by any suitable means for moving the fruit fed to the conveyor blades axially of said conveyor in member 12. Water may be injected into passageway 14 through an inlet conduit 15 connected with the conveyor at one end thereof. This water is preferably warm water of a temperature between about 80° F. and 90° F., but preferably at about 85° F.

A housing 16 preferably surrounds the screw conveyor 13 and which housing has a drain 17 for wash water and such solubles as may be dissolved therein from the fruit.

The time of washing is preferably relatively short, being say from about one to about four minutes, although this may vary somewhat according to the character of the fruit and temperature of the wash water. Ordinarily the hotter the water, the shorter the wash period, but with most products, and particularly fruit such as apricots, if the water is too hot or if the water is applied too long a period, the desired results are lost. Ordinarily a faster wash is possible where the fruit is ground up than where it is in larger pieces, since freer access is had to the undesired solubles in the fruit.

The wash water passes through the perforations in the walls of passageway 14 and generally radially outwardly therefrom through the cut fruit that is between the blades of the conveyor, and it is immediately thereafter ejected through the perforations in member 12 for draining into drain 17. It is obvious that by this method the wash water passes substantially only once over the fruit particles, and the solids that are dissolved therein or the solubles carried thereby are conducted away from the fruit immediately and the fruit is not re-subjected to such solubles over and over again, nor is there any undesirable agitation of the fruit pieces which would tend to free certain vitamins or pro-vitamins and other food ingredients that I retain in the fruit.

The passageway 14 ends at point 18 and the press 19 may be a continuation of the screw conveyor 13, but imperforate and tapered so as to progressively compress the fruit that is washed by washer 4 as such fruit is conducted to the discharge end of the conveyor 19. The perforated member 12 may continue over conveyor 19, and thus residual water, together with the solubles therein that are carried by the fruit is substantially squeezed therefrom by press 5 before the fruit reaches the discharge end of the press. This application of mechanical pressure to the washed fruit after the particular washing step hereinbefore described is quite important in many instances. Of course, the particular press illustrated is not so important. Rollers, as indicated in Fig. 3, or a separate screw press may be used. The moisture and solubles therein that are pressed from the fruit may also pass with drain 17 if desired.

The material leaving the press may pass into mixer 6 where certain condensates from the wash water may be restored to the fruit, if desired. Sometimes seasonings are added to the material in the mixer, or other ingredients may be added, but it is to be clearly understood that such seasonings or other ingredients that may be added have absolutely no effect upon the non-gumming and non-caking characteristic of the finished product. They may be added for purpose of flavor, color, or to add food values that never were present in the fruit. For example, some lemon juice may be added to accentuate certain flavors, as is common practice in connection with other foods to be eaten.

The moisture content of the material at the time it is fed to the press may be as high as 60% to 80% by weight, and it may be as low as 25% when it is discharged into the mixer. These moisture contents will, of course, vary according to whether fresh fruit or dried fruit is fed to the washer. In treating apricots for example, it is quite common to use the conventionally dried apricots whose moisture content may be about 25% when fed to the washer.

If nothing is added to the pressed material that is discharged into the mixer the latter merely functions to disintegrate or to break up the material to expedite the further drying. It is not to be understood that the ground up or cut pieces of fruit are further broken up in the mixer, but discrete pieces that have become compacted together are merely loosened up or separated.

From the mixer the material may be fed by valve 10 into one end of drier 7. Heat from any suitable source may be applied to the material in drier 7 to promote evaporation of moisture from the fruit, and the material may be moved through the drier at a predetermined rate of speed so that the moisture content of the material is reduced to the desired degree by the time said material is discharged from the discharge end of the conveyor. Ordinarily the moisture content is reduced until the discharge material contains from, say about 1½ to about 4% moisture, by weight.

In the event the drier 7 is of the vacuum type, the temperature in the drier may be about 60° C. (140° F.) to about 83° C. (175° F.) at a vacuum of, say about 29 inches of mercury, although a temperature of about 70° C. (157° F.) is preferable. Here again there may be considerable variations, since certain products, such as those containing considerable carotene, but little of other vitamins, can be dried by the conventional tunnel driers as indicated in Fig. 3, in which hot air is blown over the fruit without loss of the desired vitamins or carotene. The main thing is that the temperature and time be sufficient to evaporate the moisture from a practical standpoint to the desired degree without destroying the food values that are desirable.

From drier 7 the dried fruit may be fed by valve 11 into a grinder 8 for producing a uniform powder-like material. Of course, this grinder may be omitted in some instances where such powder-like material is not necessary.

The wash water, expressed moisture, and solubles that pass to drain 17 may be conducted into settling tanks 30, and from the latter into separators or centrifuges 31, if desired, or the settling tanks may be omitted and the material directly passed into the separators.

From the separators certain condensates or solids may be returned to the mixer 6, or they may pass to a fermenting tank 32 and then to a still 33 for the recovery of such values as may be derived from the wash water.

Where drier 7 is a vacuum drier the vapors withdrawn therefrom may be condensed in a condenser 34 and may be taken from the condenser to a separator of centrifuge 35 for recovery of any possible values as may be in the condensate.

Figure 2:
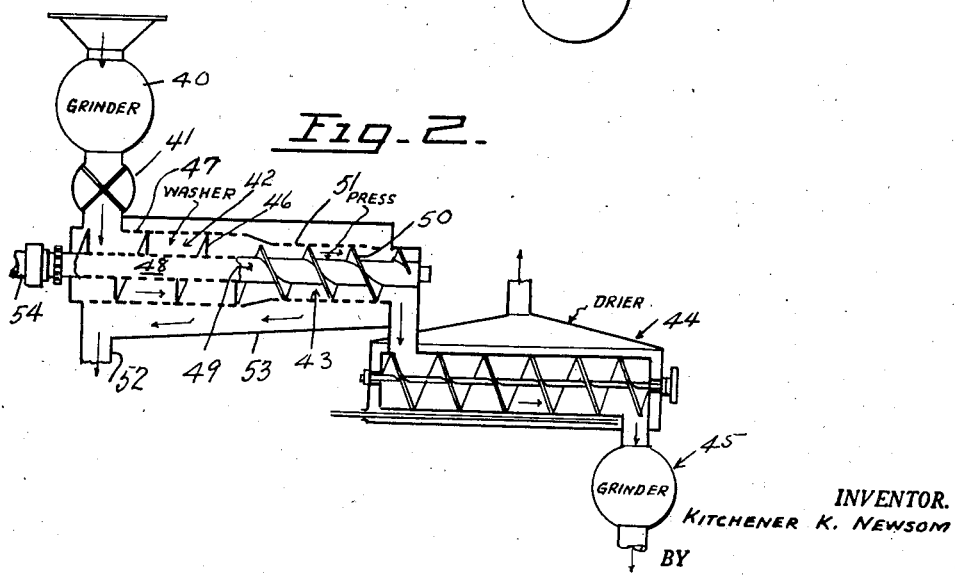
Fig. 2 is a slightly different form of apparatus than is shown in Fig. 1, and is also diagrammatically illustrated.

Referring now to Fig. 2, the process shown herein is somewhat simplified over that of Fig. 1.

The fruit may pass through a grinder 40 and past a feeder 41 into one end of a washer 42. From washer 42 the material is passed to a press 43 and from press 43 it is fed into a drier 44 and then to a grinder 45 after which the material may be packed for storage or for shipment.

The washer 42 is generally like that shown in Fig. 1 in that it may be a hollow shafted screw conveyor 46 rotatable in a perforated tubular member 47. The passageway 48 in the conveyor 46 may terminate about point 49 and from about said point the press 43 or pre-drier commences. This press may be a screw conveyor 50 of less diameter than conveyor 46, but coaxial therewith, and the former is rotatable in a reduced diameter extension 51 of member 47.

The wash water and expressed moisture is directly drained into a drain 52 that is in housing 53. The latter may enclose the washer and press.

Water is fed into passageway 48 through an inlet 54, and the conveyors 46, 50 are rotated by any suitable power means for conveying the material to the discharge end of press 43.

From the press 43 the material may be discharged into one end of a drier 44 for passage therethrough to the grinder 45. The moisture remaining in the material that is discharged from the press 43 is substantially all evaporated from the fruit in drier 44, leaving, say about from 1½ to 4%, by weight, in the material that goes to grinder 45 for grinding.

The temperature of the wash water is preferably the same as has been described with respect to Fig. 1 and the temperatures in the drier 44 may be similar to the temperatures used in drier 7.

Referring to Fig. 3, the fruit may be fed from feed hopper 60 by a feeder 61 into a grinder 62. From grinder 62 the fruit is passed into a washer 63 and from washer 63 it may be passed to a pre-drier or press 64. From press 64 the material is passed to a mixer 65 where it may be mixed with seasonings, etc., or not, as may be desired. In any event the material is loosened up in the mixer. From mixer 65 the material passes through a drier 66 and from drier 66 through grinder 67 and to a packaging station 68 for packaging.

The principal distinction between the view (Fig. 3) and that of Fig. 1 is that a different form of press is indicated, and a conventional tunnel drier 66 using hot air for blowing over the fruit is used. The process is substantially the same.

It will be seen that the wash water and moisture expressed from the fruit may be evaporated to produce a concentrate that may be added into the material in the mixer. A storage tank 69, evaporator 70, and tank 71 with a suitable pump and valve in the circuit is provided for producing the concentrate and returning it to the material.

Also in Fig. 3 I show a feed tank for any other ingredients, such as seasonings, that may be added to the material in the mixer.

The washing and pre-drying steps, whether accomplished by ribbon or screw conveyors, or by a press or evaporation, are preferably conducted out of the direct influence of the atmosphere although the final drier may be a hot air drier. Also it is quite important that the process be a continuous one, both from the standpoint of economy and from the standpoint of the product.

Any process that involves batch feeding and processing in separate steps in which the product is bound to stand or to be exposed to the atmospheric air is not found to produce the best results.

Having described my invention, I claim:

1. The process of producing a food product rich in carotene that comprises the steps of; grinding up partially dried pitted apricots, washing said ground up apricots for a relatively short period of time in warm water by flowing such water through the ground apricots into intimate contact with the particles and removing such water after substantially one passage thereof through a body of such particles, then squeezing the washed ground apricots to remove a substantial portion of the residual wash water and solubles therein, thereafter removing substantially the remainder of the moisture from said particles by evaporation, and finally re-grinding the particles so dried.

2. The process of producing a food product rich in carotene that comprises the steps of; grinding up partially dried pitted apricots, washing said ground up apricots for a relatively short period of time in warm water by flowing such water through the ground apricots into intimate contact with the particles and removing such water after substantially one passage thereof through a body of such particles, then squeezing the washed ground apricots to remove a substantial portion of the residual wash water and solubles therein, thereafter removing substantially the remainder of the moisture from said particles by evaporation, and finally re-grinding the particles so dried, the warm water applied to said particles for washing them being at a temperature of about 85° F.

3. The process of producing a food product rich in carotene that comprises the steps of; grinding up partially dried pitted apricots, washing said ground up apricots for a relatively short period of time in warm water by flowing such water through the ground apricots into intimate contact with the particles and removing such water after substantially one passage thereof through a body of such particles, then squeezing the washed ground apricots to remove a substantial portion of the residual wash water and solubles therein, thereafter removing substantially the remainder of the moisture from said particles by evaporation, and finally re-grinding the particles so dried, the warm water applied to said particles for washing them being at a temperature of from about 85° F. and the time of said washing being from about one to about four minutes.

KITCHENER K. NEWSOM.

REFERENCES CITED

The following references are of record in the file of this patent:

UNITED STATES PATENTS

| Number | Name | Date |
| --- | --- | --- |
| 2,091,675 | Ferry | Aug. 31, 1937 |
| 2,163,977 | Ferry | June 27, 1939 |
| 2,037,081 | Manning | Apr. 14, 1936 |
| 116,729 | Lowe | July 1871 |
| 1,372,112 | Wittenberg | Mar. 22, 1921 |

FOREIGN PATENTS

| Number | Country | Date |
| --- | --- | --- |
| 2,456 | Australia | June 21, 1926 |
| 17,141 | Australia | Apr. 12, 1934 |